US007899606B2

(12) United States Patent
Bartick

(10) Patent No.: US 7,899,606 B2
(45) Date of Patent: Mar. 1, 2011

(54) FUEL/AIR MIXTURE CONTROL DEVICE AND METHOD

(76) Inventor: Alfred Manuel Bartick, Redondo Beach, CA (US)

( * ) Notice: Subject to any disclaimer, the term of this patent is extended or adjusted under 35 U.S.C. 154(b) by 56 days.

(21) Appl. No.: 12/288,135

(22) Filed: Oct. 17, 2008

(65) Prior Publication Data

US 2010/0100305 A1 Apr. 22, 2010

(51) Int. Cl.
*G06F 19/00* (2006.01)
*F02D 41/14* (2006.01)

(52) U.S. Cl. ........................ 701/109; 701/114; 123/688

(58) Field of Classification Search ................. 123/472, 123/478, 482–485, 488, 688; 701/101–105, 701/109, 114, 115; 73/23.32, 114.71–114.73
See application file for complete search history.

(56) References Cited

U.S. PATENT DOCUMENTS

| | | | | |
|---|---|---|---|---|
| 2,875,744 A * | 3/1959 | Gunkel | ....................... | 123/484 |
| 3,504,657 A * | 4/1970 | Scholl et al. | ................ | 123/483 |
| 4,140,086 A * | 2/1979 | Schnurle et al. | ............. | 123/688 |
| 4,200,071 A * | 4/1980 | Maurer et al. | ............... | 123/698 |

(Continued)

OTHER PUBLICATIONS

Oxygen Sensor Simulator, Casper Electronics Website: http://www.casperelectronics.com/gp/O2SIM/index.htm, URL: http://www.mkiv.com/techarticles/oxygen__sensor__simulator/.

National Semiconductor LM555 Timer, 2006 National Semiconductor Corporation DS007851, www.national.com, URL: http://www.national.com/ds/LM/LM555.pdf.

02 Sensor simulator. Will it work, or not? -SRT Forums—SRT4, SRT6, SRT8, SRT10 & Dodge Forum, URL: http://www.srtforums.com/forums/f24/o2-sensor-simulator-will-work-not-508228/.

02 Sensor Simulator, 02 Sensor Simulator.com, URL: http://www.o2sensorsimulator.com/.

02 Sensor Simulator, Mechanical Database, URL: http:/mechdb.com/index.php/O2__sensor__simulator.

02 Simulator Simulators, Baker Electronix URL: http://webcache.googleusercontent.com/search?q=cache:-kRO29xoe8wJ:myplace.frontier.com/~vze7erz1/id16.html+dual+o2+sensor+module +baker &cd=1&hl=en&ct=clnk&gl=us&client=safari.

Simple Oxygen Sensor Simulator Circuit, PCS Electronics, Schematronics, URL: http://webcache.googleusercontent.com/search?q=cache:-kRO29xoe8wJ:myplace.frontier.com/~vze7erz1/id16.html+dual+o2+sensor+module+baker&cd=1&hl=en&ct=clnk &gl=us&client=safari.

(Continued)

*Primary Examiner*—Willis R Wolfe, Jr.
(74) *Attorney, Agent, or Firm*—George P. White

(57) ABSTRACT

In an automobile fuel control system having an EGO sensor which sends voltage to an ECM in order to adjust fuel/air ratio, the EGO sensor being disabled and replaced with a substitute signal generator circuit which stimulates the ECM toward lean-running.

8 Claims, 6 Drawing Sheets

OPEN LOOP SYSTEM

U.S. PATENT DOCUMENTS

| | | | | | |
|---|---|---|---|---|---|
| 4,407,251 | A * | 10/1983 | Nakanishi | 123/472 |
| 4,502,443 | A * | 3/1985 | Hasegawa et al. | 123/688 |
| 5,522,250 | A | 6/1996 | Gee et al. | |
| 5,714,871 | A * | 2/1998 | Endou | 322/28 |
| 6,614,313 | B2 * | 9/2003 | Crofts et al. | 331/1 R |
| 6,961,653 | B2 * | 11/2005 | Maki | 701/109 |
| 7,021,300 | B2 * | 4/2006 | Maki et al. | 123/688 |
| 7,254,474 | B2 * | 8/2007 | Iihoshi et al. | 701/109 |

OTHER PUBLICATIONS

PSO2Sim, PreCat Snooping Oxygen Sensor Signal Simulator Module, URL: http://myplace.frontier.com/~vze7erz1/sitebuildercontent/sitebuilderfiles/pso2sim.pdf.

Blick, Bob Oxygen Sensor, www.bobblick.com, URL: http://www.bobblick.com/techref/projects/o2sensor/o2sensor. html.

Blick, Bob Oxygen Sensor Simulator, www.bobblick.com, http://www.bobblick.com/techref/projects/o2sensor/o2sim/o2sim.html.

* cited by examiner

CLOSED LOOP LAMBDA
CONCEPT SYSTEM

OXYGEN SENSOR TRANSFER FUNCTION

OPEN LOOP SYSTEM

555 OPERATING PARAMETERS

- Frequency : Fo = 1/T Hz
- Period of one output cycle = T seconds
- Period when output is "High" = t1 seconds
  Also , t1 = 0.693 x ( R1 + R2 ) x C1
- Period when output is "Low" = t2 seconds
  Also , t2 = 0.693 x R2 x C1
- Duty Cycle: D = t1 / T
  Also , D = R1 + R2 / ( R1 + 2 x F
- Resistance : R in ohms
- Capacitance : C in μfarads

555 IC MULTI-VIBRATOR
( PRIOR ART )

RUN-RICH SIGNAL 42 MAPPING

INTERFACING PEGO CIRCUIT

FUEL/AIR MIXTURE CONTROL DEVICE AND METHOD

FIELD OF INVENTION

This invention relates to air/fuel mixture control system for internal combustion engines, in particular to the portion of such systems relating to mimicked oxygen sensor signals from a pseudo oxygen sensor circuit to an electronic control module.

BACKGROUND

Internal combustion engines employ a fuel control system controlled by an Electronic Control Module (ECM). The basic function of the fuel control system is to control the delivery of fuel to the engine. Fuel is delivered, for example, by a Throttle Body Injection unit and on most cars, fuel injectors associated with each engine cylinder. The main control sensor for fuel control systems is the Oxygen Sensor, which is located in the engine's exhaust system. The oxygen sensor tells the ECM the amount of oxygen in the exhaust gas stream, and the ECM changes the air-fuel ratio to the engine by controlling the fuel injection. A 14.7:1 air-fuel ratio is required for efficient catalytic converter operation and fuel economy. Because of the constant measuring and adjusting of the air-fuel ratio, the system is called a "closed loop" system. FIG. 1 shows schematically a typical system of this type.

When the engine is first started, and it is above 400 rpm, the system goes into "open loop" operation. In "open loop" operation, the ECM ignores the signal from the oxygen sensor, and calculates the air-fuel ratio based upon the input from other engine sensors. When specified conditions are met the system will go into "closed loop" operation.

The system sensor, also known as a Lambda Exhaust Gas Oxygen Sensor or EGO sensor, is located in the exhaust stream, in front of the catalytic converter, usually in the exhaust manifold or the exhaust pipe and produces a signal voltage proportional to the oxygen content in the exhaust. The industry standard for the Lambda system is a zirconium dioxide sensor. A higher oxygen content across the EGO sensor tip relative to ambient oxygen, lowers the EGO' sensor's output voltage. On the other hand, lower oxygen content will raise the output voltage of the EGO sensor. Typically, the voltage range from zero to 0.1 volts (lean) to 0.9 volts or 1.0 volts (rich). The computer processor in the ECM uses the EGO sensor's voltage to adjust the air-fuel mixture, leaning it out when the EGO sensor detects a rich condition or enriching it when it detects a lean condition. The EGO sensor generates an analog voltage signal from 0 to 1. Volt, comparing the difference of the oxygen in the exhaust and the oxygen in the ambient air. The EGO sensor is based on the Lambda system concept, which is the symbol engineers use to indicate the ratio of one number to another. For air-fuel control, Lambda indicates the ratio of excess air to stoichiometric air quality. At an air-fuel ratio of 14.7:1, as much air as possible combines with the fuel. There is no excess air and there is no shortage of air, Lambda, therefore equals 1. With a lean mixture of say, 15, 16, or 17:1 there is excess air left after combustion. The Lambda air-fuel ratio of excess air to desired air is then greater then 1, It may be, say, 1.03, 1.07, 1.15 or some other number. With a rich mixture of say, 13, or 14:1, there is a shortage of air and the Lambda ratio is less than 1, such as 0.97, 0.93, 0.89, ect. With Lambda ratios less than 0.8 or greater than 1.2, a typical engine will not run. These values equate roughly to air-fuel ratios of 12.5:1 and 18:1. A typical system uses the Lambda zirconium dioxide sensor such as made by Bosch.

The zirconium dioxide EGO sensor works similar to a galvanic voltage source to generate voltages up to +1 volt. It's effective range is 0.1 to 0.9 volts (100 to 900 millivolts). When exhaust gas oxygen content is low (rich mixture), EGO sensor voltage is high (0.45 to 0.90 volts). When exhaust gas oxygen content it high (lean mixture), EGO sensor voltage is low (0.10 to 0.45 volts). FIG. 2 shows the EGO's operating range at temperatures of about 800 degrees C. (1,473 degrees F.). Notice that EGO sensor output voltage changes most rapidly near a Lambda ratio of 1, which makes it ideal for maintaining a stoichiometric ratio. The EGO Sensor must warn up to at least 300 degrees C. (572 degrees F.) before it will generate an accurate signal output.

In use, the Lambda EGO sensor develops a voltage between it's two electrodes. While all Lambda EGO sensors work on the same principle, construction may differ. Some Ego sensors have a single wire connection with ground return for it's output voltage circuit, while others may have two wire interfaces with ground return through the computer. Yet other EGO sensors may have an added built-in pre-heater, implemented through an additional single wire or wire-pair, to accelerate EGO warm-up time.

The exact location of the EGO sensor varies for different engines. Some sensors are located on the exhaust manifolds while others may be up steam of the catalytic converter.

SUMMARY OF THE INVENTION

A new and novel method for the reduction of normal fuel consumption for Lambda concept internal combustion engines is detailed with the engine exhaust gas oxygen sensor (EGO) disconnected electrically from it's normal interface with the engine control module (ECM). This causes the engine's fuel-air mixture control system feed-back to operate in an open-loop mode, where-in this novel and new invention known as; the "pseudo engine exhaust gas oxygen (PEGO) circuit" electrically exploits this open-loop feed back condition by acting as a substitute EGO electrical signal generating source which issues a periodic and false "engine-running-rich" signal to the oxygen sensor-input port of the ECM. The engine's fuel-injection control system in-turn "leans-out" the fuel-air mixture in response to this periodic and false ECM input signal, thus reducing the engine's normal fuel flow while driving without materially effecting vehicle performance. Reduction of fuel consumption by this method maintains the engine's leaned-out fuel-flow performance within the limits of the vehicle manufacturer's own fuel-air mixture control-window.

DETAILED DESCRIPTION

The following explanation does not attempt to describe the detailed operation of a Lambda concept system, as such descriptions are available in prior art. This disclosure includes such information as is necessary and helpful to understand this invention.

Figure 1:
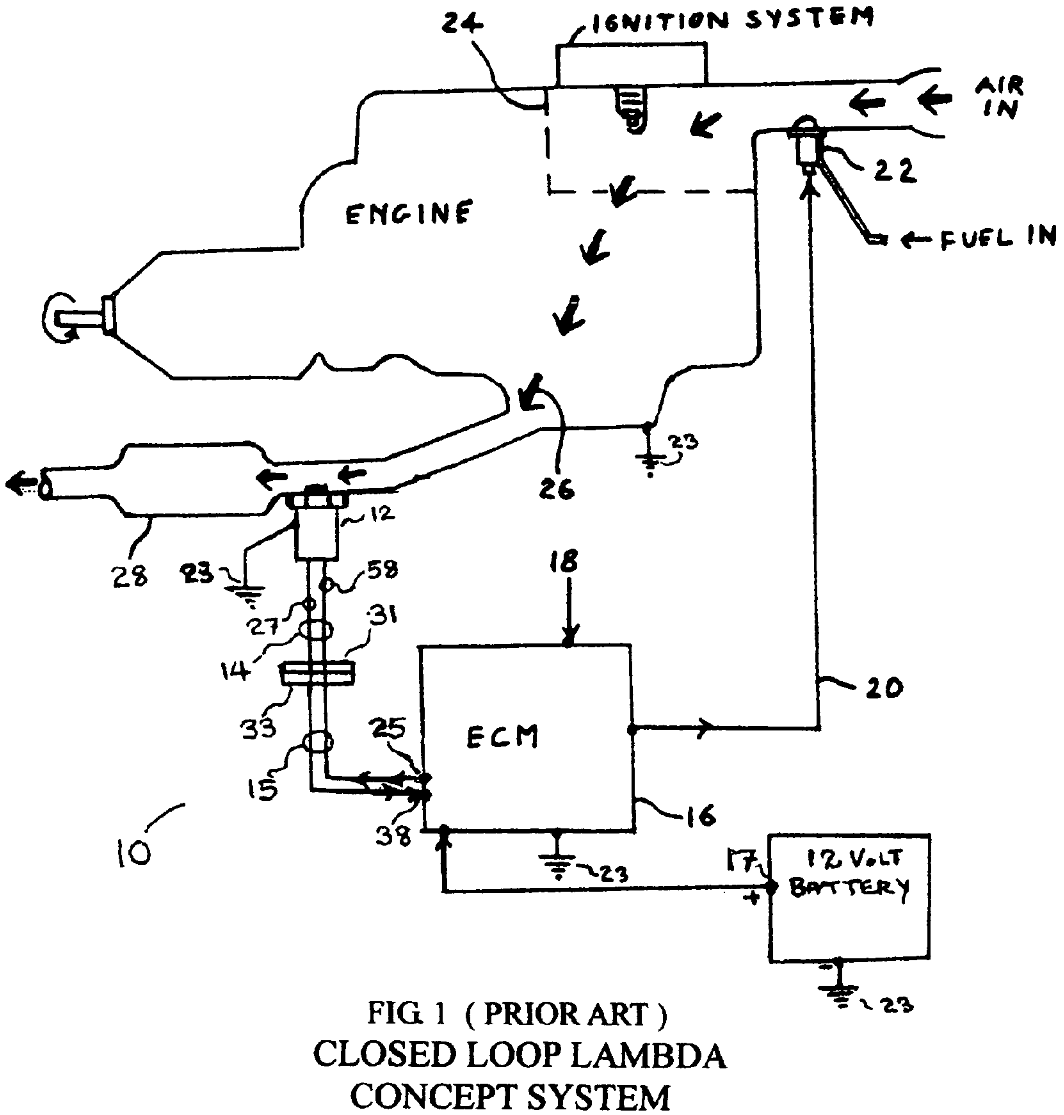
FIG. 1 ( PRIOR ART )
FIG. 1 shows schematically a typical closed loop Lambda type system of the prior art.
Figure 2:
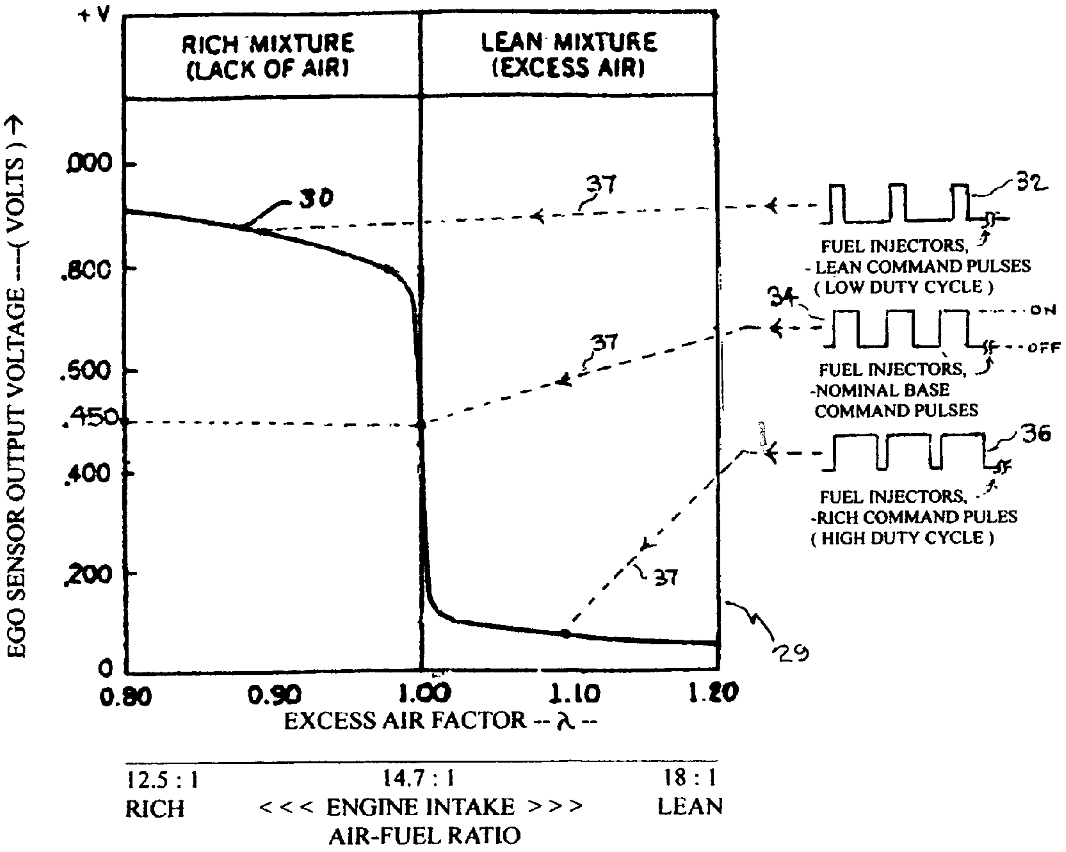
FIG. 2 ( PRIOR ART )
FIG. 2 shows schematically the transfer-function curve and associated fuel-injector command pulse mapping and duty cycles of the prior art.

FIG. 1 shows a simplified schematic, of prior art closed loop fuel control Lambda system 10 as used commonly throughout the automotive industry. FIG. 2 shows schematically the Exhaust Gas Oxygen sensor's (EGO) 12, it's transfer function 29, curve 30 and the relationship between the EGO sensor output voltage, air-fuel ratio (12.5:1 to 18:1), excess air factor (0.8 to 1.2) and fuel injection Command signal mapping 37 upon curve 30.

Referring again to FIG. 1, the output voltage from EGO sensor 12 is fed via wire harness 14 and 15 to the ECM 16 oxygen input port 38 where it is processed along with other engine sensor inputs indicated at 18 to produce command signals along line 20 to injectors 22 to vary the fuel flow and air-fuel ratio. The ECM output commands on line 20 causes adjustments of the fuel injectors to either lean or enrich the fuel-air mixture to the combustion chamber 24, the exhaust stream 26 then flows past EGO sensor 12 and through the catalytic converter 28. The EGO sensor 12 is connected to ECM 16 via wiring harness 14 and 15, through connector pair 31 and 33 which are demated upon implementation of the present invention as will be more fully described below. In the ECM 16, the EGO sensor 12 output voltage is compared with an internal ECM reference voltage for processing by the ECM 16. Of special note is the fact that the EGO's 0.45 volt nominal output level correlates with idealized engine operation for an air-fuel ratio of 14.7:1 as designed into the system by the vehicle manufacturer.

Departure of the EGO sensor's output voltage from this nominal level as compared with the ECM's own internal +0.45 volt reference level, constitutes a "differential error signal" voltage which is operated upon by the ECM's computer-processor, thus creating a dynamic and varying negative feedback control function required for proper fuel flow control. This feedback control system thus strives to Null-Out this "error signal" to maintain the nominal 14.7:1 air-fuel ratio while driving, and after engine warm-up.

A standard Lambda concept system controls the fuel flow to the engine intake by means of fuel injectors 22, it receives and responds to varying pulse width modulated electrical ON-OFF command pulse-trains, which flow via line 20 from the ECM 16 unit. These electrical signal commands and their associated command pulse-trains are shown mapped 37 upon the EGO sensor 12 transfer function 29 in schematic FIG. 2, with lean command 32 (low duty cycle), nominal base command 34 and, rich command 36 (high duty cycle) being evident .i The present invention apparatus and method replaces a closed loop fuel-air mixture feedback system 10 shown schematically in FIG. 1, with an open loop feed back system 11, as shown schematically in FIG. 3. Incorporated, this new and novel invention issues a voltage signal output which closely mimics an "Engine Running-Rich" signal causing the Lean Command 32, as shown FIG. 2, to manifest for the duty cycle period of this mimicked "Engine Running-Rich" signal, thus follows an attendant lean-running fuel-air mixture condition which reduces normal engine fuel consumption during driving. Below is a more detailed description of this novel and new invention.

Figure 6:
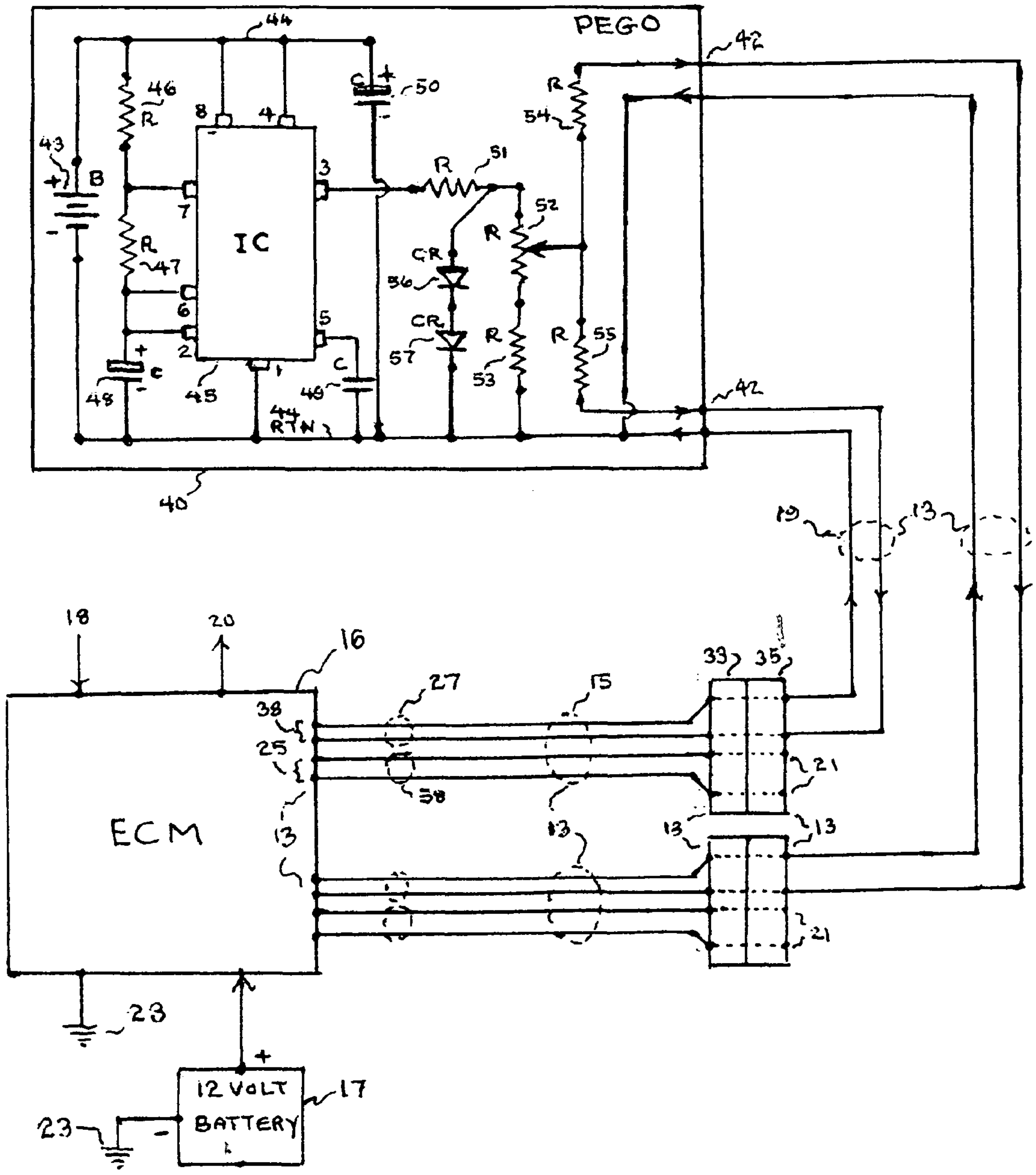
FIG. 6 shows schematically the pseudo oxygen sensor circuit invention with it's engine control module interfaces.

Lambda concept engines based upon the Bosch design typically utilize 1, or 2 standard Lambda engine exhaust gas oxygen sensors (EGO) 12 for fuel-air mixture control. These numbers relate to the quantity of sensors used in the 4 cylinder, 6 & 8 cylinder engines, respectively. One or more additional oxygen sensors are typically mounted down stream of the catalytic exhaust converter(s) These sensors are not usually involved with the engine's fuel-air mixture feed back control system. More than one air-fuel mixture control system may exit in these engines, with each system possessing it's own individualized ECM module 16, signal-processor/oxygen-sensor input port(s) 38. Said input port(s) 38, co-operates with an exhaust-mounted EGO 12 oxygen sensor(s) signal output(s) lines 27 and it's attendant fuel-injector(s), fuel flow, all of which are dedicated to a given bank of engine cylinders. The negative feed back control of the fuel-air mixture to each cylinder-bank being based in part upon the standard Zirconium dioxide type Lambda oxygen sensor 12 and it's universally accepted EGO sensor's transfer function 29 as detailed previously in earlier discussions and as shown in FIG. 2 of this disclosure. This pseudo EGO circuit invention, aka; the PEGO circuit 40, has the ability to issue multiple mimicked "Run-Rich" signal output(s) 42 to more than one ECM module 16 oxygen input port(s) 38 at the same time via the PEGO circuit 40 output signal-splitting-isolator network resistors 54 & 55, which are shown in FIG. 6. Since the typical ECM module 16 oxygen input port(s) 38 exhibits an electrical input impedance in the Meg ohm range (usually a voltage follower). It can be said with certainty that the combined electrical loading and interactive effects by one or more of a network of oxygen-sensor input port(s) 38 upon the very much lower generator output impedance of the PEGO circuit 40 is negligible.

The 555 IC signal source used in this novel and new application has been configured to operate at a "free-running frequency"—$F_o$; in the range of $F_o$=1 to 3 Hz and with a "duty cycle"—D; in a range of D=70 to 95%. These 555 IC circuit operating parameter values above were established during prototype testing and by the judicious selection of circuit values; resistors 46 & 47, and circuit capacitor 48. All these circuit values being calculated via the mathematical relationships as shown schematically in FIG. 4. In the preferred embodiment, the very small integrated circuit chip employed within this PEGO circuit invention is used universally in numerous prior art industrial applications. In this invention, the classical-type 555 Integrated Circuit functions not as a timer, but as an astable multi vibrator-square-wave generator. This invention circuit is fashioned as a printed circuit board with components mounted thereto. The 555 IC circuit current drain is approximately 0.5 milliamps of electrical power for the PEGO circuit 40 which is derived from a 3.0 volt battery 43 which is integral with the PEGO circuit 40 circuit-board and its small-universal water-proof housing which have not been illustrated herein. Alternately, via an optional voltage scaling circuit, the vehicle's \0 12 volt battery 17, could readily be employed as an alternate source of the IC 45 circuit power supplying the +Vcc 44 voltage-bus. Details of which have not been shown herein.

Figure 4:
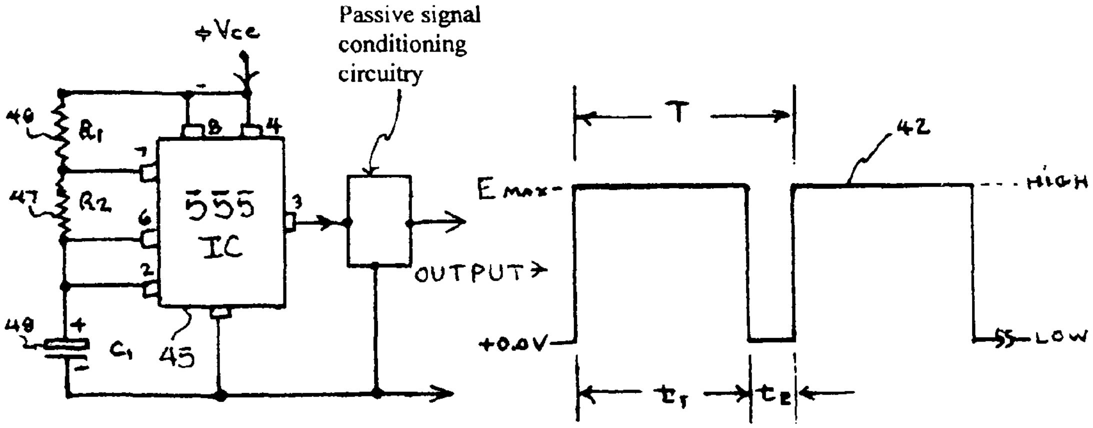
FIG. 4 shows schematically the 555 Integrated Circuit of the prior art and the pseudo oxygen sensor circuit performance parameters.

The 555 IC output signal is a square wave for this unique invention-application, which has been creatively engineered and structured to periodically and cyclically Mimic the electrical output signal level extremes of the standard Lambda EGO 12, engine exhaust gas oxygen sensor when the engine's exhaust-gases indicates that the engine and it's fuel-air mixture control-system is performing mainly in the rich and/or lean air-fuel mixture operating regions of the Lambda zirconium-dioxide oxygen sensor transfer function 29, curve 30, as shown in FIG. 2. For this discussion, the engine's "rich air-fuel mixture" operating signal condition as described earlier, shall be termed the "Run-Rich" signal 42 operating condition in this disclosure, the wave form and parameters of which are shown in FIG. 4 and apply to this invention's principle embodiment.

This mimicked "Run-Rich" periodic and cyclic electrical output signal 42 wave form having a high maximum value level of approximately +0.75 to +0.90 volts for the t1 period of the periodic wave form and a low minimum value level approximately +0.0 to +0.1 volts for the t2 period of this same wave form. Thus, this novel and new "Run-Rich" signal operating condition conceived and utilized in the prototype version of this invention results in a meaningful reduction of the normal engine fuel consumption while driving at most road speeds and without any significant loss in vehicle performance. Vehicle fuel savings achieved and documented with this invention installed was in the range of $\geqq 5\%$ for city and $\geqq 12\%$ for highway driving. While at the same time, the engine's fuel-air mixture control system operates within and not beyond the limits of the vehicle manufacturer's own air-fuel mixture feedback control window. This performance-window being based upon the limits of the Lambda EGO 12 oxygen sensor transfer function 29, curve 30 for both rich and lean running mixtures.

There are millions of mature Bosch/Lambda concept vehicles on the road which utilize the standard Zirconium-dioxide Lambda exhaust gas sensor(s) 12 as a key element in their closed-loop air-fuel mixture control systems. In these vehicles, a form of the standard ECM 16, electronic control module, is always directly interface-wired to receive one or more oxygen sensor output signal lines 27 as shown in FIG. 1.

Operating closed loop, the ECM's internal signal processor and feed-back system, continually "hunts" to maintain engine performance at a stoichimetric air-fuel ratio of 14.7:1, which effectively equates to a Lambda excess air-fuel factor Lambda=1.00.

The standard zirconium-dioxide sensor's intrinsic transfer function 29, curve 30 for all output voltage values, related to all air-fuel mixtures of interest, are shown in FIG. 2 along with the key air-fuel ratio cross-over point of 14.7:1.

During standard Lambda concept engine closed loop feed back operation, for the slower-acting narrow-band feed back systems, the standard Lambda EGO 12 oxygen sensor output signal 27 voltage varies dynamically at a low frequency rate while continually dithering approximately about the +0.45 volt intercept point on curve 30. This results in a continually varying and correlateable negative feedback error signal within the ECM 16 unit which is signal-processed to nominalize the engines air-fuel mixture at or about the 14.7:1 cross-over point while the engine is operating at most all road speeds and road conditions after engine warm-up.

Figure 3:
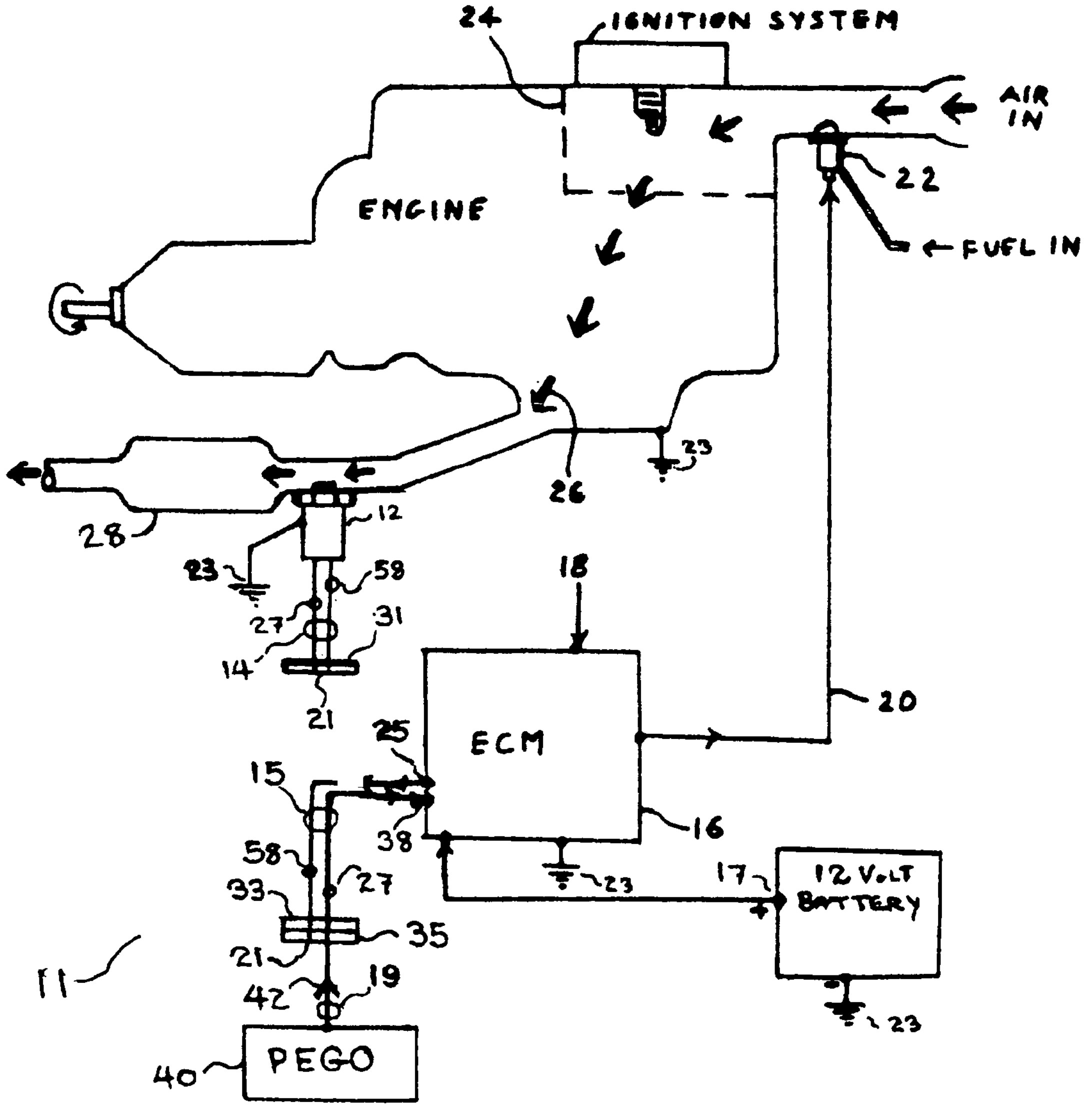
FIG. 3 shows schematically the open loop embodiment of the invention installed in an engine.
Figure 5:
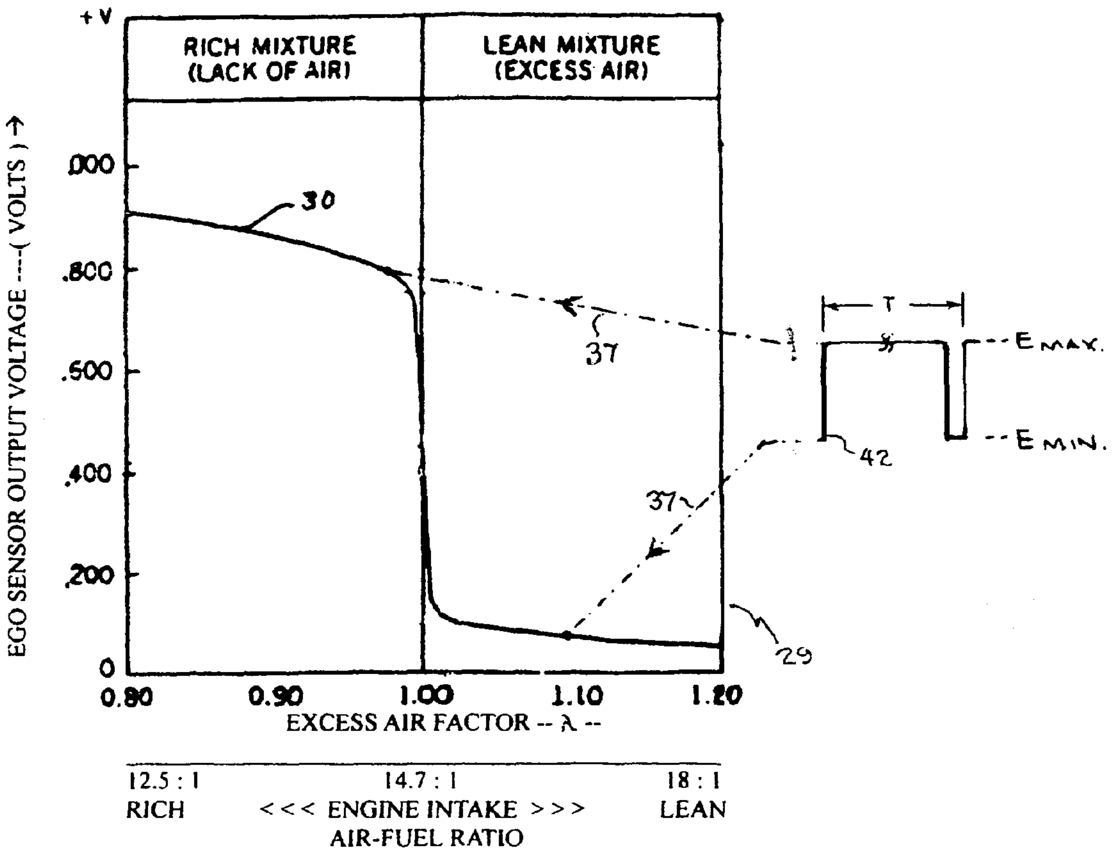
FIG. 5 shows schematically the mapping of the Run-Rich Signal upon the oxygen sensor transfer function curve.

However, in the case of the open loop systems 11, for this new invention as shown in FIG. 3, the PEGO circuit 40 issues this "Run-Rich" signal 42 to the oxygen-sensor input port 38 of ECM 16. This creates a negative feed back error signal within the ECM's signal-processor which it attempts to nullify. In it's attempt to nullify this false error signal; the negative feed back nature of the ECM 16 signal processor causes a significant correction signal to take place within ECM 16 which counters this false error signal in the form of a slightly reduced normal fuel flow to the fuel injector(s) 22 via command 32, thus leaning out the normal air-fuel mixture at most all vehicle speeds, and without any significant effect upon vehicle drivability. The PEGO circuit 40 "Run-Rich" signal 42 output is a periodic and cyclic square wave form; see FIGS. 4 & 5. Implemented in this invention, said periodic output wave form "maps" upon the standard Lambda oxygen sensor 12, transfer function 29, curve 30, as shown in FIG. 5, and correlates with the following signal parameters mapping 37: period T=t1+t2, with t1=the period of time when the signal is "high" and equals a maximum voltage level of approximately +0.75 to +0.90 volts; while period t2=the period of time when the signal is "low" and at a minimum voltage level of approximately +0.0 to +0.10 volts. Period T equals the full period of one periodic cycle and has an equivalent free running frequency $F_o=1/T$, which can be in the approximate operating frequency range of 1 to 3 Hz for the PEGO circuit 40.

An effective value for the operating duty cycle D=t1/T was found to be in the range of approximately 70 to 95%; which equates to the "Run-Rich" signal 42 output from PEGO circuit 40 being in the "high level state" (engine running Lean), 70 to 95% of the time, immediately followed by operation in the "low level" state (engine running Rich), 30 to 5% of the time; the Lean-running state significantly overriding the Rich-running state. The preferred embodiment in prototype form was road tested, and it possessed a nominal duty cycle, D=85% along with a nominal operating frequency of $F_o=2.0$ Hz. The approximate PEGO circuit 40 output wave form parameter values attendant and operational during these road tests were: T=0.500, t1=0.425 and t2=0.075 seconds, with a maximum output voltage level of +0.85 volts during the t1 period and a minimum output voltage level of +0.0 volts during the t2 period.

A fully detailed schematic of the PEGO Circuit 40 design in this novel and new invention is shown in FIG. 6. FIG. 3 schematically details the open loop system 11 embodiment and the incorporation of the PEGO circuit 40 along with its key engine-related elements, wherein a standard engine exhaust mounted Lambda EGO sensor 12 is electrically disabled by means of it's dedicated interface connector 31 being open-circuited 21 from its normally mated connector pair, 31-to-33. Disabling the EGO sensor 12, electrically defeats both it's oxygen-sensor signal output circuit lines 27 and it's preheater power source 25 with it's attendant preheater circuit lines 58. Defeating of the oxygen-sensor signal output circuit lines 27 function is key to the implementation of this novel invention for open-loop feed back operation.

The vehicle's instrument panel service-engine light may flag as a side-effect to open-loop operation, however this flag is due to the disabling of the EGO sensor 12 and should not impact vehicle drivability or safety; additionally it is true that the implementation of this new invention may cause an increase in smog emissions.

However it is also true that no stringent smog emission control laws exist in approximately 17 states in the U.S.A. and in most countries of the world. However it is also true that an offsetting reduction of the smog emissions, per tank of fuel, will occur due to the reduction of engine fuel consumed by means of this new invention.

Engine-incorporation of this invention is readily achieved by simply connecting the new PEGO circuit 40, signal output connector 35 to the existing ECM 16 interface connector 33 as shown in FIGS. 3 and 6. This creates a new connector pair, 33-to-35. This newly created connector-pair now channels only the mimicked PEGO circuit 40, "Run-Rich" fuel-air mixture output signal 42 to the ECM 16 oxygen-signal' input port 38 for signal-processing and subsequent leaning-out of the air-fuel mixture while driving. The new-mating of connectors 33-to-35 is the creative new element in this new open loop feed back system, resulting in a near constant reduction of the normal fuel flow to the fuel-injectors as previously discussed. All significant circuit components and their description and/or function relating to the open-loop embodiment of this novel invention were established in prototype and were partially discussed earlier. Additional, key invention elements are detailed as summarized below:

a) Integrated circuit 45/IC; a classical type 555 CMOS integrated-circuit operating as a free running square wave generator.

b) Battery 43/B1; the Vcc 44 power bus source for the PEGO circuit 40.

c) Battery 17; a 12 volt alternate automobile power source which could readily be scaled down to meet the PEGO circuit 40, Vcc 44 power bus level of approximately 3.0 volts d) Capacitor 48/C1; a polarized, low leakage, 15 volt rated cap whose function is that of setting the free running frequency and duty cycle of the integrated circuit 45 in conjunction with resistors 46 and 47. There being a marinade of interactive values for these two resistors and capacitor 48 who's selected operable range is 10 to 100 micro farads.

e) Capacitor 49/C2; a ceramic, 100 volt, IC noise decoupling cap of a value of approximately 0.01 micro farads.

f) Capacitor 50/C3; a polarized, 15 volt cap of approximately 100 micro farads value, functions as a 3.0 volt power line decoupling cap.

g) Rectifier diodes 56/CR1 and 57/CR2; computer switching type diodes, 1N4148 or equivalent. Series connected they form approximately a 1.2 volt clamping level to fix/stabilize the output signal level for PEGO circuit 40 internal circuitry.

h) Resistors 46/R1 & 47/R2; ⅛ th watt, various selected values set PEGO circuit 40 duty cycle and operating frequency along with capacitor 48.

i) Resistor 51/R3; ⅛ th watt, approximate operable range, 5.1 K to 7.5 K ohms. Functions to drop IC 45 output waveform voltage to design level.

j) Resistors 52/R4 & 53/R5; ⅛ th watt, approximate operable range, 10. k to 20 K ohms (adjustable) and 10. k to 20 K ohms fixed respectively. Both 52 and 53 function as a resistive voltage-divider network; resistor 52 is for factory-adjustment of the "Run Rich" signal 42 output level issuing from PEGO circuit 40.

k) Resistors 54/R6 & 55/R7; ⅛ th watt, approximate operable range, 75 K to 150 K ohms each. Functions as a resistive signal-splitter-isolator network to channel one or more "Run Rich" signal 42 output(s) from PEGO circuit 40 to one or more ECM 16 oxygen sensor input port(s) 38.

l) Oxygen Sensor 12; a standard galvanic type output voltage source, exhaust manifold mounted which detects the oxygen present in engine exhaust gas stream. A key element in Lambda concept closed lop air-fuel mixture feed-back control system(s) as used in prior art.

m) Electronic control module ECM 16; a standard electronic engine control and management signal processor module as used in the prior art. AKA; engine management computer in the prior art.

n) Harness, Oxygen Sensor 14; functions to electrically conduct oxygen sensor output signal(s) to the ECM 16 input(s) and also conducts pre-heater power lines 58 to the oxygen sensor(s) from the ECM 16, as used in prior art.

o) Harness, ECM, 15; functions to electrically conduct the same signals as listed above for oxygen sensor harness 14, also used in prior art. However when used in the new open-loop feed back mode of this novel invention, the ECM 16, wire harness 15, electrically channels only the "Run Rich" signal(s) 42 from the PEGO circuit 40 output to the ECM 16, oxygen sensor input port(s) 38. The pre-heater circuit being disabled/open circuited 21.

p) Harness 19; electrically conducts the "Run Rich" output signal(s) 42 issuing from the PEGO circuit 40 to the ECM 16 oxygen sensor input port(s) 38.

q) Connector-pair 31-to-33 disabled; unplugged, electrically disables EGO 12, oxygen sensor(s) and pre-heater interfaces feeding to-and-from the ECM 16 unit, allowing implementation of open-loop feed back systems operation of this new invention in co-operation with the PEGO circuit 40.

r) Connector pair 33-to-35; newly mated, they interface the PEGO circuit 40 electrical "Run Rich" output signal(s) 42 to the ECM 16 oxygen sensor input port(s) 38, creating a new and novel invention interface which is the basis of implementation.

s) Oxygen sensor input port(s) 38; a high input impedance port which in the prior art receives standard Lambda oxygen sensor(s) 12 electrical output signals and/or receives the open loop "Run Rich" signal(s) 42 from PEGO circuit 40 for fuel-air mixture feed back control(s).

t) Run-Rich signal 42; a periodic and cyclic, two level electrical output signal issuing from PEGO circuit 40 which closely mimics the Standard oxygen sensor 12 signal output.

u) Vcc 44; a voltage input power bus feeding IC 45, which is equal to 3.0 volts.

v) Pre-heater circuit power source 25; an ECM circuit source for oxygen sensor pre-heater, 12 volt power.

w) Open-circuit 21; occurs when normal closed loop system connectors are de-mated and the attendant circuit paths open-circuited and disabled, this without circuit electrical damage resulting.

x) Oxygen sensor Output Lines 27; electrical output signal and path from sensor.

y) Pre-heater power lines 58; feeds oxygen sensor pre-heater via wire harness 15.

z) Mirror image 13; all elements of multiple harness and interface/circuit paths being similar in form, part for part and function for function.

Testing the effectiveness of the vehicle-installed PEGO circuit 16 was straight forward, that is, filling-up the fuel tank and tracking the fuel consumption against the mileage traveled. Another more incisive, moment by moment, approach is that of monitoring the actual electrical DC output signal voltage of a vehicle's oxygen sensor 12 (during open loop operation) by simply electrically test-wiring the oxygen sensor 12 signal output circuit 27 to an accurate high-impedance voltmeter such as a FLUKE-model 23. Observing, in real-time, and recording the oxygen sensor 12, output voltage levels while driving under varying road speeds and also under city and highway driving conditions.

The following voltage levels were consistently recorded to be in the +45 to +100 milli volt DC range after engine warm up, From these data, it can be deduced from FIG. 2, the Lambda oxygen sensor transfer function 29, curve 30, that in fact the PEGO circuit 40 does operate as conceived with it's "Run-Rich" output signal 42, operating at a duty cycle of approximately 85%, the "Run-Rich" signal 42 stimulated the engine's air-fuel mixture control system to mostly perform in a Lambda ratio range of approximately 1.0 to 1.10; the lean running region of oxygen sensor transfer function 29, curve 30, thus reducing normal fuel consumption while driving at highway and city speeds after engine warm-up.

Incorporation of this PEGO circuit 40 invention into an existing vehicle engine system has been discussed whereby electrical connectors 33 to 35 are utilized to interface the PEGO circuit 40 "Run-Rich" signal output(s) 42 to the ECM module 16 oxygen-input port(s) 38; with the Lambda oxygen sensor(s) 12 disabled/open circuited 21, as shown in FIG. 3.

An alternate and viable means of open loop implementation of this invention is the electrical connecting of the PEGO circuit 40 to the ECM 16 unit by electrically-splicing/directly connecting harness 15 into harness 19 (wire-for-wire) while abandoning the use of system connectors 33 & 35 altogether. Details of said mechanical-splicing means having not been shown schematically herein.

Incorporating the packaged new invention into the passenger compartment is the most ideal mounting location for the PEGO circuit 40 housing to limit operating temperature extremes. An alternate location being that of the engine compartment, while positioning this new invention as far away from high-heat sources as possible; far from the engine's exhaust systems.

In reality, most of today's Lambda concept vehicle engines have two exhaust-mounted EGO oxygen sensors 12, each of which is dedicated to a given bank of cylinders. A separate closed loop fuel-air mixture, negative feed back control system does exist for each of these oxygen sensors. Each overall fuel-air mixture control system being the exact mirror image 13 form, part-for-part, of the other. Both fuel-air mixture control systems function identically and independently of the other and operate as described earlier in this disclosure. These Lambda engine system designs may vary from MFR to MFR, but are well known for their common Lambda concept oxygen-sensor 12 design basis in the prior-art. For this reason, the inventor has omitted describing these second and identical Lambda system elements, by means of graphics, schematics, or numerous replicating identifiers #'s in FIG. 1.

In the case of the principle embodiment of the PEGO circuit 40 invention for use in this novel Open Loop fuel-air mixture control mode, as shown in FIGS. 3 & 6, I have also, similar to the above, omitted extra identifiers #'s from the second and separate "Run-Rich" signal output 42 channel from the PEGO circuit 40 to the ECM 16, as shown in FIG. 6, this for reasons of their near identical nature, part-for-part, function-for-function; each a mirror image 13 form of the other; each duplicates all of the "Run-Rich" signal output 42 path elements between the PEGO circuit 40 signal output(s) and the engine control module ECM 16 oxygen-sensor input port(s) 38 with their attendant fuel-air mixture signal processors which have not been illustrated herein.

Once installed in the vehicle, the PEGO circuit 40 can provide trouble-free, hands off operation between 3.0 volt battery changes. There is no ON-OFF power switch provided for this invention. Failure of battery 43 after long term operation has no significant deleterious effect upon vehicle operation except for increased fuel consumption. The electrical output signal level issuing from the PEGO circuit 40 decays to approximately zero volts upon battery failure. A low-battery voltage indicator circuit could easily be incorporated to signal the need to change the battery. It should be noted that Lambda concept engines operate in an open loop feed back mode, when cold, until proper engine temperatures are reached. Additionally, open loop feed back also occurs during full open-throttle operation, such as when hill climbing. During cold-starting and hill climbing, the incorporated PEGO circuit 40 has no controlling effect upon the engine's fuel-air mixture. Although a particular embodiment of the invention has been described and illustrated herein, it is recognized that design modifications and variations, may occur to those skilled in the art and consequently it is intended that the claims be interpreted to cover such modifications and equivalents.

U.S. PATENT DOCUMENTS SEARCHED BY INVENTOR

U.S. Pat. No. 4,015,569—Apr. 5, 1977—LESHNER—123/133, ETC.

U.S. Pat. No. 4,326,487—Apr. 27, 1982—MAISCH—123/453, ETC.

U.S. Pat. No. 4,350,131—Sep. 21, 1962—KUICHI—123/453, ETC.

U.S. Pat. No. 4,364,361—Dec. 21, 1982—ECKERT—123/453, ETC.

U.S. Pat. No. 4,387,687—Jun. 14, 1982—HÖPPEL—123/493, ETC.

U.S. Pat. No. 4,971,016—Nov. 20, 1990—PETERS—123/500, ETC.

U.S. Pat. No. 5,355,856—Oct. 18, 1994—PAUL—123/446, ETC.

U.S. Pat. No. 5,377,636—Jan. 3, 1995—RIX—123/446, ETC.

The invention claimed is:

1. A signal generator for use with an automotive engine having an electronic control module, comprising: a free-running oscillator with a predetermined frequency, duty cycle, and output voltage levels wherein the predetermined frequency is between about 1 Hz and about 3 Hz; the predetermined duty cycle is between about 70% to about 95%; in the high state;

further comprising a housing and an electrical connector adapted for operative interconnection to the electronic control module's upstream oxygen sensor input.

2. The signal generator of claim 1 wherein predetermined means with no facility for readily user adjustability during operation.

3. The signal generator of claim 1 wherein said free-running oscillator produces a square pulse train having a low voltage output level between about 0.0 V and about 0.35 V and a high voltage output level between about 0.75 and about 0.95 V.

4. The signal generator of claim 3 wherein predetermined comprises that all signal determining components are of a fixed value without adjustability.

5. An engine control system comprising:

a) an ECU having a first input connection for an upstream oxygen sensor and designed to operate in a closed loop Lambda mode based upon the signal received at that first input;

b) a signal generator operatively connected to the ECU's upstream oxygen sensor input, the signal characteristic of said signal generator output comprises a periodic waveform with a frequency between about 1 Hz and about 3 Hz; further, the signal generator having no operative requirement for connection to an oxygen sensor.

6. The engine control system of claim 5 wherein the signal characteristics are predetermined prior to use.

7. A method for controlling an air-to-fuel mixture of an internal combustion engine comprising in an open-loop manner:

a) oscillating a free-running electrical signal at predetermined frequency and duty cycle wherein the predetermined frequency is between about 1 Hz and about 3 Hz and the predetermined duty cycle is between about 70% to about 95% in the high state;

b) coupling, operatively, the signal to an engine electronic control unit upstream oxygen sensor input, in lieu of an oxygen sensor;

c) adjusting, automatically by the engine electronic control unit, the air-to-fuel mixture based upon the state of the input signal; wherein free running and open loop, collectively limit the method, at least, to being without operative input from an upstream oxygen sensor.

8. The method of claim 7 wherein the oscillating comprises a square pulse train with the signal characteristics predetermined such that the characteristics remain substantially constant.

* * * * *